2,814,319

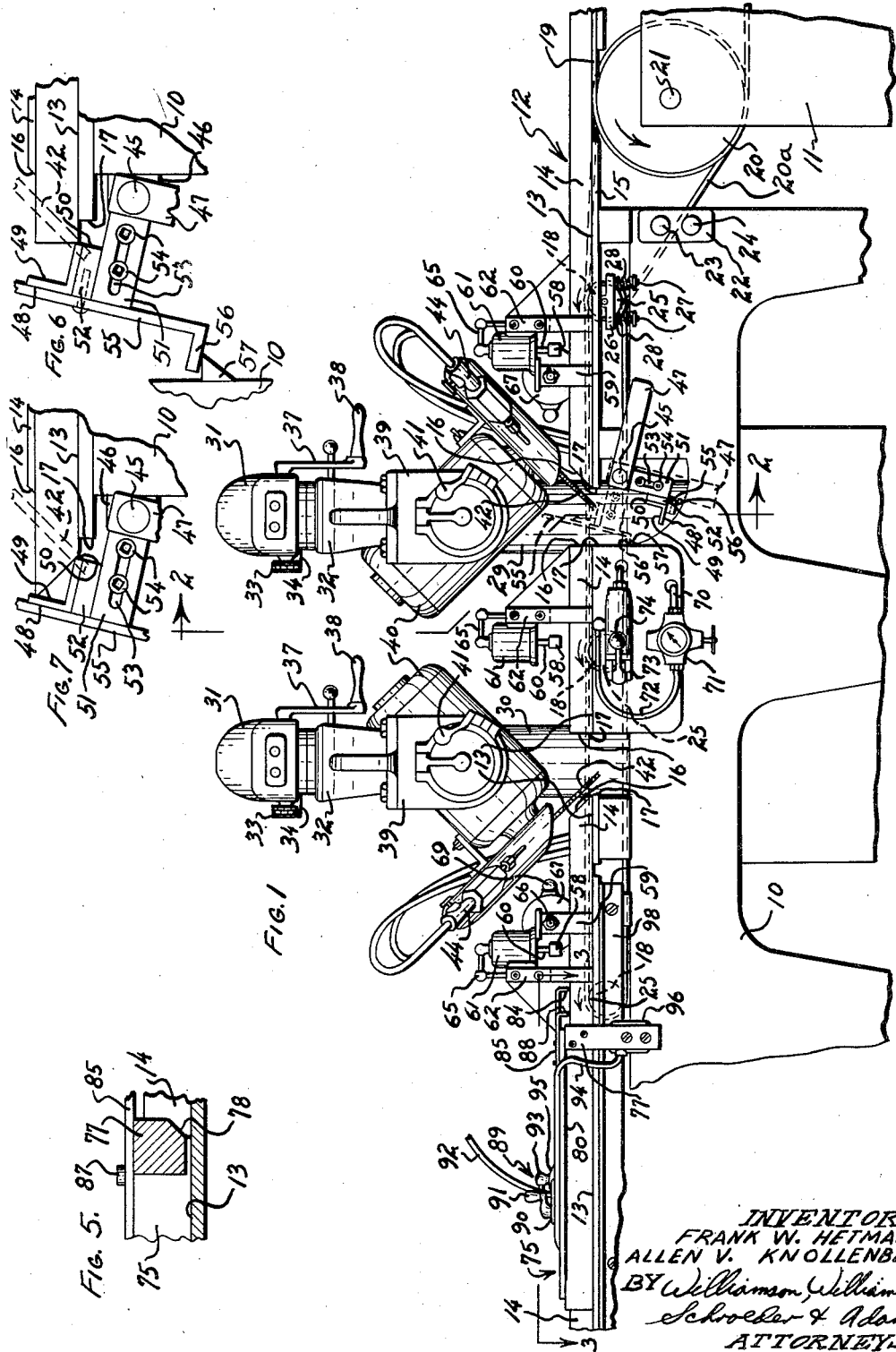
Nov. 26, 1957    F. W. HETMAN ET AL    2,814,319
SASH SAW FOR MITERING SIMULTANEOUSLY A PLURALITY OF PIECES
Filed Aug. 16, 1954    2 Sheets-Sheet 1
INVENTOR
FRANK W. HETMAN
ALLEN V. KNOLLENBERG
BY Williamson, Williamson,
Schroeder & Adams
ATTORNEYS Nov. 26, 1957     F. W. HETMAN ET AL     2,814,319
SASH SAW FOR MITERING SIMULTANEOUSLY A PLURALITY OF PIECES
Filed Aug. 16, 1954     2 Sheets-Sheet 2
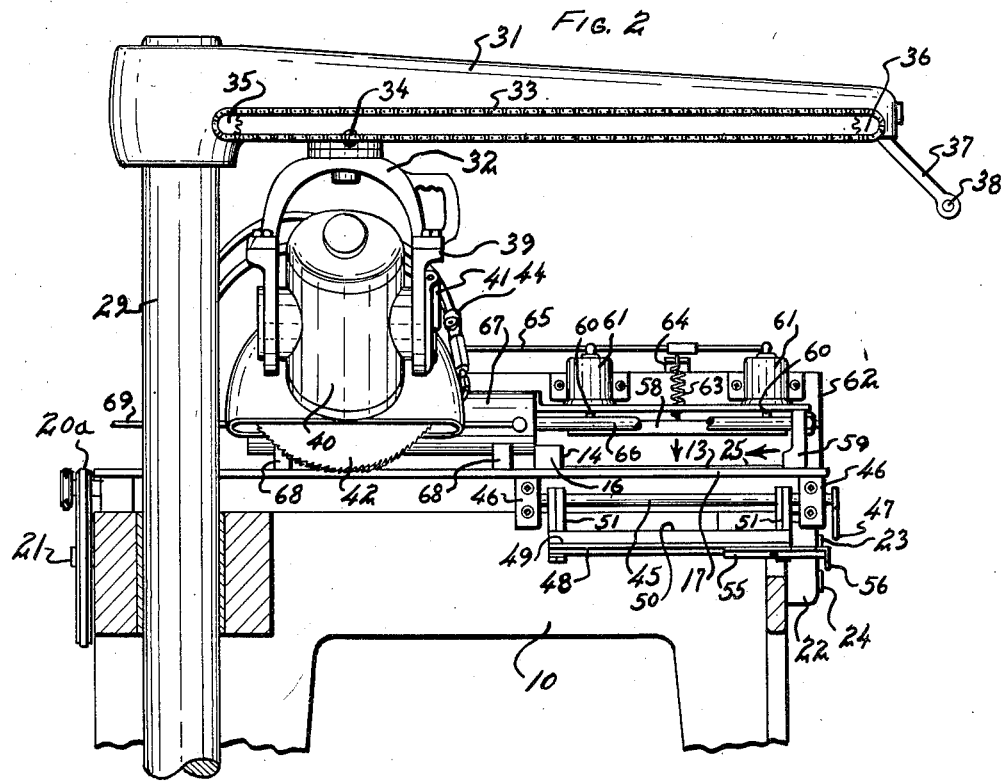
INVENTOR
FRANK W. HETMAN
ALLEN V. KNOLLENBERG
BY Williamson, Williamson,
Schroeder & Adams
ATTORNEYS United States Patent Office 2,814,319
Patented Nov. 26, 1957

SASH SAW FOR MITERING SIMULTANEOUSLY A PLURALITY OF PIECES

Frank W. Hetman and Allen V. Knollenberg, Minneapolis, Minn., assignors to Self Storing Window Co., Inc., Minneapolis, Minn., a corporation of Minnesota Application August 16, 1954, Serial No. 450,132

5 Claims. (Cl. 143—47)

This invention relates to a cutting apparatus and more particularly to a sash saw adapted to cut frame members for mitered corner joints.

It is a general object of the invention to provide a cutting apparatus in which a plurality of sash members can be quickly and efficiently measured and cut at an angle. A number of saw devices have been proposed for cutting lengths of various elongated members, sometimes simultaneously cutting a plurality of such members. No particular problem is encountered in making square end cuts where two simultaneously finished ends are produced. Measurements may either provide for continuous feeding of stock with allowance made for the width of the cut, or the stock may be brought forwardly with the previously cut end lying against an abutment positioned at a prescribed distance from the projected path of a saw. However, in the case of frame members having angled ends for corner construction, there are several problems which militate against the development and use of machinery for cutting a plurality of such members in a rapid and sure manner. Because of these problems it has been customary to employ saw devices in which the members are measured and cut individually, the only pre-set arrangement then being the angulation of the reciprocable saw with respect to the saw bed.

One of the aforementioned problems in cutting angled sash members involves accuracy of measurement of the elongated members. Since the frame members have a distinctive inside and outside edge, the mitered corners must be cut at opposite angles rather than at the same angle. Thus it becomes necessary to make two cuts for each length and to discard a triangular waste piece from the stock. Measurements therefore must be made not only from square ends, as in the case of frame stock in uncut lengths, but also from previously cut ends with an angle sloping downwardly and forwardly from the inside to outside edge of the stock, and from oppositely cut ends with an angle sloping downwardly and rearwardly from the inside to the outside edge of the frame members. Obviously it is difficult to employ measuring mechanism which will accommodate these various types of end cuts and workmen have preferred the simpler but slower method of measuring individual members as each is being cut.

Another of the problems encountered in cutting a plurality of sash members is that of simultaneously and firmly clamping the members so that a single rapid cut will prepare the ends of a number of such members. It is necessary that the members be firmly held on a plain surface and also firmly held against one another to prevent ragged edge cuts and inaccurate angulation.

It is therefore a more specific object of the invention to provide a sash saw for cutting simultaneously a number of frame members in which novel clamping mechanism quickly retains the frame members in rigid and proper position for sawing and quickly releases the members for further processing in the machine.

It is another object of the invention to provide in apparatus of the class described, means for moving under reduced friction the sash saw either forwardly or rearwardly on a saw table, yet permitting the stock to be clamped firmly against an upwardly facing flat surface at any prescribed longitudinal position desired.

It is a further object of the invention to provide a sash saw having stop members cooperating with the saw table supporting surface and having the ability to accommodate engagement with the stock ends of various shapes and angulations.

These and other objects and advantages of the invention will more fully appear from the following description made in connection with the accompanying drawings, wherein like reference characters refer to the same or similar parts throughout the several views, and in which:

Fig. 1 is a front elevation of our sash saw, unessential portions being cut away and the raised position of the stop member being indicated in dotted line;

Fig. 2 is a vertical section taken on the line 2—2 of Fig. 1 and looking in the direction of the arrows;

Fig. 3 is a top plan view of the slidable stop member taken in the direction of the arrows 3—3 of Fig. 1;

Fig. 4 is an enlarged segmented view of the clamping mechanism taken on the line 4—4 of Fig. 3;

Fig. 5 (sheet 1) is an enlarged vertical section taken across the contacting bar of the slidable stop on the line 5—5 of Fig. 3 and looking in the direction of the arrows;

Fig. 6 is a schematic view of the extensible and retractable stop member showing the engaged relation with the end of a piece of frame stock in uncut condition, the position of the projected path of the saw being indicated in dotted lines; and Fig. 7 is a schematic view of the stop mechanism shown in Fig. 6 in operative engagement with the cut end of a piece of stock material, the position of the projected path of the saw being indicated in dotted lines.

With continued reference to the drawings, Fig. 1 shows a general view of the entire apparatus which may be supported on heavy and sturdy leg members 10 and connected with an attached or separately positioned traveling mechanism 11 for advancing the stock material forwardly and rearwardly as will be set forth later in the specification. The base 10 has attached at a working height, a miter table 12 which in turn has a supporting surface 13 preferably horizontal and perfectly plane. and a longitudinal upstanding guide rail 14 rearwardly of the forward edge 15 of the table member 12. Formed transversely of the table supporting surface 13 and the guide rail 14 is a pair of slots or openings defined by the edges 16 intermediate the ends of the guide rail 14 and the transversely formed edges 17 formed intermediate the ends of the table supporting surface 13. Additional slots are formed transversely of the table supporting surface 13 at 18 to accommodate several roller members as will be set forth in detail later in this specification. The guide rail 14 with its discontinuous transverse slots lies in a single plane against which stock material may be pressed in side engagement. The supporting surface 13 likewise forms a single plane across the discontinuous slotted areas including the roller receiving slots 18.

Traveling mechanism for advancing the frame stock over the supporting surface comprises an elongated belt, the outer end of which is not shown in the drawings but the closer end of which constitutes a belt 19 passing over a roller 20 which in turn is journaled on shaft 21 to the supporting legs 11. The upper surface of belt 19 is intended to be positioned at or slightly above the plane of the supporting surface 13 so that stock material traveling lengthwise of belt 19 will be continuously advanced on the supporting surface 13 without substantially changing its plane of movement. The traveling mechanism may be operated by an independent power source (not shown) and controlled by a manual switch 22 having a starting button 23 for causing the belt 19 to move on drum or roller 20 in the direction of the arrow and another button 24 for causing the roller 20 to rotate in the reverse direction, thus retracting stock material which may be positioned on the upper surface of belt 19. Since the advancing and retracting of stock material along the traveling or feeding mechanism takes but a short period of time, no provision is made for independently starting or stopping the motor for operating the traveling or feeding mechanism. The operator merely maintains the button 23 or button 24 in depressed condition until the stock travels to the desired position.

A portion of the traveling or feeding mechanism resides in the independent roller elements 25 which are journaled on bracket members 26, the bracket members 26 in turn being mounted on upstanding rods or bolts 27 secured to the frame 10 so that the brackets 26 are vertically reciprocable thereon and resiliently tensioned in an upward direction by compression springs 28 preferably mounted concentrically over each of the bolts or rods 27. Several of the roller members 25 are disposed across the table supporting surface 13, in the instant case three rollers being so positioned. Each of the rollers 25 is projectable upwardly through a corresponding transverse slot 18 formed in the supporting surface as shown. One of the rollers is spaced between the end of the traveling or feeding mechanism 19 and a transverse slot or opening across the entire table. A second of the three roller elements is positioned intermediate the two transverse openings or slots across the supporting surface and upstanding guide rail, and the third roller element is positioned in a transverse slot beyond the second opening across the entire table top as shown in Fig. 1. Each of the small roller elements 25 has driving connection with the drum or roller 20 as indicated by the interdriven belt connections 20a so that the peripheral travel of the independent roller elements 25 will be at the same rate of speed as the travel of the traveling feed belt 19. When the feed belt is reversed in direction, the rollers 25 will likewise be reversed in the same direction and at the same rate of speed. The positioning of the rollers 25 with respect to the drum or roller 20 is such that the belt interconnection between the rollers will not be disengaged by the slight resilient movement of the rollers 25 while being depressed against the action of the compression springs 28 upon which the brackets 26 and their respective rollers 25 are journaled.

A pair of reciprocable saws are mounted on the mounting structure 10 and are positioned on respective standards 29 to the right in Fig. 1 and 30 to the left of the medial position. Each of the standards 29 and 30 bears a forwardly extending arm 31 which receives the mount or carriage saw 32 in guided and slidable relation. A roller chain 33 is secured at 34 to the saw carriage 32 and is also received on the two pinions 35 and 36 which are journaled in spaced relation on the arm 31. The pinion 36 is drivably connected to a crank 37 which has a handle 38 extending to one side of the arm 31 as shown in Figs. 1 and 2. Rotation of crank 37 will cause the chain 33 to move and thereby cause the saw mount or carriage 32 to move lengthwise of arm 31 in guided relation against turning movement thereon. The carriage 32 has a U-shaped arm 39 upon which a motor 40 is mounted in trunnion fashion, the angulation of the motor being adjustable in a number of clamped positions by means of the manual clamp 41 as shown in Figs. 1 and 2. The motor 40 has journaled to its shaft a circular saw blade 42 which is in turn surrounded by a shield or fender 43 which exposes the lower working portion of the saw blade 42 as shown in Figs. 1 and 2. Means 44 may be mounted on the saw shield or fender 43 so as to project through the shield a spray of cutting fluid during operation of the saw. It is understood that each of the saw devices mounted on the respective standards 29 and 30 may be identical in structure with the exception that the general angulation of the respective saw mechanisms are in opposite directions so as to produce angulations in cut material to one side or the other of the perpendicular. The saw blades 42 are constructed so that they can cut metal and are particularly useful where the sash material comprises extruded aluminum material. It is understood, of course, that the saw connections, after adjustment to the predetermined angle, are very rigid with respect to their mounting and with respect to movement in any direction other than the projected path of travel created by the turning of handle 37. The saw blade in its projected pathway will traverse the guide rail 14 and the table supporting surface 13 while lying in the transverse slot or opening formed across the table as previously described. The width of the saw travel and the width of the supporting surface 13 is such as to accommodate a number of elongated pieces of stock material in side-by-side relation.

In order to bring the stock material to the proper position for sawing, it is necessary that a stop member be employed to simultaneously position all of the pieces of stock material in proper relation with the projected pathway of each of the saw blades 42. We accomplish this by a special elongated stop bar which is projectable and retractable from one of the openings formed across the table top and having a configuration such as to properly engage the forward ends of the stock pieces whether cut squarely across or angulated forwardly or rearwardly. The stop bar is pivotally mounted on a transverse shaft 45 just below the table supporting surface and is preferably journaled across depending brackets 46 as shown in Fig. 2. The shaft 45 has a manual lever 47 secured thereto and extending forwardly of the apparatus so that it can be rotated through an arcuate path to bring the stop bar up into position. The stop bar comprises an angulated elongated piece 48 having an upstanding lip or abutment 49 which is adapted to extend farthermost in an upward and rearward direction with respect to the direction of travel of the incoming stock material, and further has a lip or abutment 50, which is best seen in Figs. 1, 6 and 7, which is adapted to lie at a lower position and more forwardly than the first mentioned lip or abutment. The elongated bar 48 is adjustably mounted on a pair of radially positioned brackets 51 which in turn are secured to the shaft 45. Adjustment of bar 48 may be effected by sliding the mount 52 in adjusted relation with the slot 53 on brackets 51 and secured thereto by such means as set screws 54. A latch member 55 is pivotally secured to the mount 52 and is adapted to swing from a position longitudinally aligned with the stop bar 48, as shown in Figure 2, to a position at right angles thereto as shown in Figure 6. Latch member 55 has an L-shaped head 56 which clears frame 10 when in its outer extended position shown in Figure 2, but which will engage the abutment 57 on frame 10 when swung to its lower position as shown in Figures 1 and 6. When it is desired to lower the stop bar 48 from the stop position shown in Figure 6, the latch member 55 with its L-shaped head 56 is merely moved arcuately back to its longitudinally aligned position of Figure 2 so that head 56 will no longer engage abutment 57 and the entire stop mechanism will be permitted to assume the lower full line position shown in Figures 1 and 2.

It will be noted that when the stop bar is raised to intersect the plane of table top surface 13, the abutment 50 will lie just above the plane of the supporting surface. This abutment is then in a position to engage the lower leading edge of frame stock members as illustrated schematically in Fig. 6 and thereby be in the best position for a minimum of waste when the saw cut is made in the projected path indicated in dotted lines. Now, however, when the stock material has been previously cut so that an angle such as that shown in Fig. 7 is formed, then the material will not engage the abutment or lip 50 but will contact the upper and more rearwardly formed lip or abutment 49. Here again when the saw cut is made along the dotted line position, a minimum of waste will be effected in forming the angulated end. The relationship of the elongated stop bar with respect to the supporting surface 13 is such that even though the stock material is raised slightly from the surface thereof when traveling over the rollers 18, nevertheless the aforementioned abutting operation will take effect when the material is advanced against the stop bar.

Since the saw cutting is quite drastic, especially in connection with cutting a plurality of metal frame members, the problem of accurately clamping the members in position has been met and solved by the clamping mechanism disclosed herein. It is necessary that the plurality of frame members not only be held securely against guide rail 14 but also must be held down accurately against the supporting surface 13. In order to accomplish adequate clamping during the sawing operation, we provide a hydraulic clamping means in the form of a top clamping bar 58 which previously lies in spaced horizontal relation transversely of the table support surface 13 and an upstanding side clamping bar 59 as shown in Figs. 1 and 2. The clamping mechanism is duplicated three times in the instant form of the invention, one clamp being disposed to the right of the center position, a second clamp being disposed between the saw connections and a third clamp being disposed forwardly of the second saw, all as set forth in Fig. 1. The top clamping bar 58 is mounted on a hydraulically operated rod 60 adjacent each end and a hydraulic cylinder 61 is mounted on the clamp mount 62 to accommodate each of the rods 60 as shown in Fig. 2. The internal structure of the hydraulic cylinder may be conventional in form, a spring being employed internally to retract each of the pistons and rods 60 when air pressure is released from the cylinders. Additional spring means 63 may be interposed between a bracket 64 on the clamp mount 62 and the top clamping bar 58 to assist in returning the clamping bar as soon as pressure is removed from the hydraulic cylinder 61. The fluid supply line for both of the cylinders 61 is shown at 65 and the single source may simultaneously supply both of the cylinders.

The upstanding side clamping bar 59 is caused to travel transversely of the table top and is mounted on a piston rod 66 which in turn is reciprocable within hydraulic cylinder 67 mounted to the supporting structure 10 by such means as the brackets 68 as shown in Fig. 2. A hydraulic supply line 69 provides the force necessary to operate the piston and rod 66 in the direction of the arrow in Fig. 2. A conventional spring return may be positioned within cylinder 67 or a hydraulic connection for double action may be supplied as is well-known in the art, the side clamping bar 59 being operable to clamp inwardly against the guide rail 14 and to retract the upstanding clamping bar in the opposite direction to release the stock material after each clamping and sawing operation. In the instant case, only the outside clamping mechanism is provided with the horizontal cylinders 67 and their associated upstanding side clamping members 59, whereas all three of the clamping members are provided with the vertically operating top clamping bars 58. We have found that it is feasible to have all three of the clamping mechanisms operating simultaneously and therefore only one set of supply lines need be furnished to the source 70 of fluid under pressure. The fluid from source 70 may be passed through a pressure regulator 71 and thence by means of tubular connection 72 to a valve actuator 73. The valve actuator 73 has a manual handle 74 for admitting fluid such as air under pressure to all of the hydraulic cylinders previously mentioned. We have found that the vertically operating clamping bar 58 may be actuated simultaneously with horizontally moving clamping bar 59 and still obtain the proper positioning and clamping of a plurality of the stock members prior to the sawing operation. In some instances, the plurality of stock members may be clamped in one direction before the clearance between the members can be fully taken up by the laterally disposed cooperating clamp. The nature of the clamping arrangement is such that by merely releasing fluid pressure through handle 74 for but an instant and then applying pressure again, the slack may be taken up from between the stock members and the supporting surface and guide rails.

Beyond the most forwardly disposed clamping mechanism for the stock material, we provide another abutment indicated generally at 75, the latter being slidably mounted on the table 12 in a longitudinal direction and comprising as its important components a pointer 76 and a stop bar 77 as shown in Fig. 3. The stop bar 77 is spaced slightly above the table supporting surface 13 as shown in Fig. 5, and is adapted to lie at right angles to the guide rail 14 during its use. The forward lower edge of stop bar 77 is angulated as at 78 to accommodate the forwardmost ends of stock material which have been cut by the first saw to the right as viewed in Fig. 1. The angulated or bevel edge 78 forms a secure engagement in the same angular relation as the cut ends when the pieces are advanced across the table. It is important that the stop bar 77 be accurately positioned and firmly held during the measuring operation, since any deviation from the perpendicular with respect to the guide rail will cause variation in the measurements of the stock material and particularly with respect to those pieces which lie in farthermost position from the guide rail. The stop bar 77 is therefore secured to the slide mount 79 and a cross brace 80 is secured diagonally by fasteners such as rivets 81 to the outwardly extending ends of slide mount 79 and stop bar 77 respectively. The adjustable pointer 76 is mounted to the upper surface of slide mount 79 and adjustably secured through an elongated slot 82 by such means as bolts 83. The forwardmost portion of pointer 76 terminates in a downwardly extending point 84 as shown in Fig. 1. A second pointer 85 is similarly mounted for longitudinal adjustment through its slot 86 by fasteners 87 adjacent the first mentioned pointer 76. The pointer 85 also terminates in a downwardly extending end 88 as shown in Fig. 1. In order to secure the stop bar 77 in firm relation with respect to table surface 13, a hydraulically controlled element 89 provides a rapid and sure clamping of the stop bar 77. The hydraulic element 89 has a manual valve 90 operable through handle 91 to permit fluid entering under pressure from line 92 to be transmitted through the two lines 93 and 94 which lead respectively to a side clamp 95 and to a second clamp 96 disposed at the forward edge of the table surface 13. The clamp 95 has a short cylinder 97, as shown in Fig. 4, provided with a piston and extensible rod member 98 which is adapted to engage the guide rail 14 and hold the slide bar 79 securely therewith. Simultaneously, fluid under pressure in tube 94 actuates the clamp 96 so as to cause the upward projection of the piston and rod 97 to engage an angle iron piece 98 secured in turn to the outermost edge of the table 12 for the requisite distance forwardly of the second saw element as shown in Fig. 1.

In the use and operation of our sash saw, a plurality of identical stock pieces are placed upon the feed belt 19 with their inner edges facing upwardly and the outer edges in contact with the belt. The actuating button 23 is then depressed so as to cause the belt to travel forwardly with the roller 20 rotating in the direction of the arrow. The stock pieces will then project forwardly onto the supporting surface 13 and engage the uppermost surface of the roller element 25. The roller element 25 will then space the plurality of stock frame members in very slight clearance with the table top so as to prevent frictional drag in the forward movement of the members, The elongated stop bar 48 is then rotated to its intersecting dotted line position as shown in Fig. 1 with the latch bar in abutted relation with the abutment 57 on frame 10. As previously noted, the elongated stop bar will lie slightly above the plane of the table surface and the advancing ends of the stock material will strike the lowermost edge or abutment 50 and lie in stopped engagement therewith. When all of the members have been advanced into this abutted relation, the manual button 23 is released and the operator actuates the fluid valve handle 74. The top clamping bar 58 will then be projected downwardly toward the inside edges of all the stock frame members and the upright clamping bar 59 will be simultaneously moved inwardly toward the guide rail 14. When the clamping members lie in stopped and clamping relation with the stock frame members, the operator momentarily releases the clamp valve handle 74 and again applies fluid pressure to the hydraulic cylinders to simultaneously actuate all of the clamping bars in unison. The stock frame members will move inwardly in compacted side-by-side relation and also will be firmly clamped against the upper surface 13 of taper 12. In the course of clamping the bars to the table top, the roller 25 lying to the right of the first saw element as shown in Fig. 1, will be depressed to lie exactly in the plane of the supporting surface. The elongated abutment bar 48 is then withdrawn to the full line position after having released the latch member 55 as is previously noted. With the bars then lying in the position schematically illustrated in Fig. 6, the handle 37 is rotated in a counterclockwise direction as viewed in Fig. 2 to cause the motor 40 and saw blade 42 to advance on the lateral arm 31 and with the blade angulated and traveling in a projected pathway lying across the supporting surface 13 and in the slotted opening across the table surface 13 and guide rail 14. The rotating saw blade 42 will cut all of the ends of the frame members at the desired angle and the compacted relationship of the stock frame material will prevent the formation of ragged edges during the cutting operation. The crank 37 is then reversed to bring the saw back to its original position rearwardly of guide rail 14 and the valve handle 74 is actuated to release the air pressure on the clamping members. The top clamp 58 will then move upwardly and the abutment 57 will then move outwardly to release pressure on the cut frame members. The manual abutment 23 is again depressed to cause the feed belt 19 to advance and bring the stock material along the table and over the other two roller members 25 until the cut ends engage the stop bar 77 with the cut surface lying against the angulated bevel 78. It is understood, of course, that the sliding stop bar 77 has been previously positioned in accordance with the pointer 76 so as to predetermine the length of the stock material from the stop bar 77 back to the second of the saw members lying closest to the stop bar 77. The clamping mechanism is again actuated through handle 74 as previously described to firmly clamp the plurality of frame members in their stopped position against stop bar 77. This second saw is then actuated by rotating its handle 37 in the same manner as the operation of the first saw previously noted. This second saw blade is angulated in the opposite direction to the first with the blade disposed downwardly and rearwardly as shown in Fig. 1. Upon retraction of the second saw, the plurality of frame members are completed and may be removed from the device when the valve handle 74 releases the clamping mechanism. As previously described, the roller members 25 and particularly the roller 25 which is in the forwardmost position will be depressed to the surface of the table 13, but will again rise upwardly to its supporting position for minimizing friction between the stock members and the table surface during travel thereof.

At this point, the remainder of the stock material will have an angulated cut in the opposite direction to that desired for the frame members and as illustrated in Fig. 7. The abutment 24 is now depressed so as to cause the feed belt 19 and the individual rollers 25 all to rotate in the opposite direction, thus bringing back the feed material until the cut ends lie rearwardly of the first saw blade mounted on standard 29. Again the stop bar 48 is raised to its dotted line position and the feed mechanism is reversed by depressing the mount button 23. The forward ends of the stock material will then advance toward the stop bar 48 but this time will not engage the lower abutment 50 but rather the upper and more forward abutment 49. It is understood that whenever the stop members engage an abutment, the feed belt and roller members will frictionally slip in their contact with the stock members while exerting pressure against the stop member. Again the clamping bars 58 and 59 will be actuated to clamp the plurality of members in the position shown in Fig. 7, so that the saw mechanism mounted on standard 29 can be brought forwardly in the same projected path indicated by the dotted lines in Fig. 7. It will be noted that the stock material will thus be conditioned with a minimum of waste since only the triangular piece lying at the forwardmost end of the stock material will be discarded. Having again cut the ends of the stock pieces, the process is repeated, utilizing the forwardmost abutting bar 77 and the second saw mounted on standard 30. When it is desired to change the length of the frame members, the stop bar 77 may be quickly adjusted to a new longitudinal position, utilizing the pointer 76 in conjunction with lineal indicia on the table 12 for predetermining the length of material to be cut.

It may thus be seen that we have devised a sash saw which will quickly make mitered corner cuts on a plurality of stock frame members through a pair of saw elements mounted in conjunction with a miter table top and having novel stop means and clamping elements to rapidly and accurately measure and secure all of the frame members in proper position for cutting at either end.

It will, of course, be understood that various changes may be made in the form, details, arrangement and proportions of the various parts without departing from the scope of our invention.

What we claim is:

1. A sash saw for cutting mitered frame members which comprises, a table having a supporting surface and a longitudinal upstanding guide rail, an elongated stop mounted transversely of the longitudinal disposition of said table supporting surface and projectable to a position closely overlying said supporting surface and retractable therefrom, traveling mechanism for advancing frame stock over said supporting surface and into endwise engagement with said stop, clamping means overlying said table supporting surface, said clamping means having adjustable horizontal and vertical clamping surfaces respectively movable downwardly toward the table surface and inwardly toward said guide rail for holding various numbers of similar frame members to be cut in parallel clamped engagement, and a reciprocable saw mounted for sawing movement in an angulated path traversing said table supporting surface whereby frame stock may be advanced longitudinally into abutting engagement with said stop, then held from the top and from the side to said table supporting surface and guide rail respectively while said saw is reciprocated to effect precise angle cuts in said frame stock.

2. A sash saw for cutting mitered frame members which comprises, a table having a supporting surface and a longitudinal upstanding guide rail, an elongated stop mounted transversely of the longitudinal disposition of said table supporting surface, and projectable to a position closely overlying said supporting surface and retractable therefrom, traveling mechanism for advancing frame stock over said supporting surface and into endwise engagement with said stop, a top clamping bar overlying said table supporting surface and forcibly projectable downwardly for firmly clamping frame stock in said position of endwise engagement with the stop, an upstanding side clamping bar in spaced clearance with said guide rail and forcibly projectable toward the guide rail with frame stock interposed therebetween and still in said stopped position, and a reciprocable saw mounted for sawing movement in an angulated path traversing said table supporting surface whereby frame stock may be advanced longitudinally into abutting engagement with the stop, then held from the top to the supporting surface and held from the side to said guide rail while said saw is reciprocated to effect precise angle cuts in said frame stock.

3. A sash saw for cutting mitered frame members which comprises, a table having a supporting surface with a forward feed end portion and a rear end portion, a longitudinal upstanding guide rail and a transverse slot formed through said supporting surface and said guide rail, an elongated stop mounted transversely of the table supporting surface and having an offset lip projectable minutely through said slot and intersecting the plane of said supporting surface, said stop also having an abutment spaced rearwardly from said lip and upwardly from said supporting surface, traveling mechanism for advancing frame stock rearward over said supporting surface and into endwise engagement with said stop, a top clamping bar overlying said table supporting surface and projectable downwardly for firmly clamping frame stock in said position of endwise engagement with the offset lip of said stop, an upstanding side clamping bar in spaced clearance with said guide rail and forcibly projectable toward the guide rail with the frame stock interposed therebetween and still in said stopped position, and a reciprocable saw aligned with said slot and mounted for sawing movement in an angulated path traversing said table supporting surface whereby frame stock having a lower forward corner angle of substantially 90 percent or less may be engaged by said offset lip and frame members having a forwardly projecting upper corner edge will engage said abutment, after having been advanced longitudinally of the table supporting surface, and then the stock will be clamped upon said supporting surface and against said guide rail while said saw is reciprocated to effect precise angle cuts in said frame stock to minimize wastage thereof.

4. A sash saw for cutting mitered frame members which comprises, a table having a supporting surface, a longitudinal upstanding guide rail and a transverse slot formed across said supporting surface and said upstanding guide rail, a stop having an elongated offset lip intersecting the plane of said supporting surface and extending transversely of the table and through said slot, said lip being swingably mounted on an axis extending transversely of the table for movement downwardly through said slot, traveling mechanism for advancing frame stock over said supporting surface and into endwise engagement with said stop, a top clamping bar overlying said table supporting surface and forcibly projectable downwardly for firmly clamping frame stock in said position of endwise engagement with the stop, an upstanding side clamping bar in spaced clearance with said guide rail and forcibly projectable toward the guide rail with frame stock interposed therebetween and still in said stopped position, and a circular saw aligned with said slot and mounted for sawing movement in an angulated path traversing said table supporting surface with said outer circumference lying in said table slot adjacent said offset lip of the stop member whereby frame stock may be advanced longitudinally into abutting engagement with the stop, then held from the top to the supporting surface and held from the side to said guide rail while said saw is reciprocated to effect precise angle cuts in said frame stock.

5. Mechanism for controlling movement of elongated work pieces in a sash saw device having a longitudinal miter supporting structure and an angulated transversely movable saw, said mechainsm comprising a top clamping bar adapted to be disposed in substantially parallel spaced relation with an upwardly facing support surface of the miter structure and transversely of the longitudinal disposition thereof, a controllable power element connected with said top clamping bar for advancing the same toward said upwardly facing support surface of the supporting structure for clamping work pieces thereagainst, a side clamping bar adapted to be disposed in widely spaced relation with an inwardly facing upright side surface of the miter supporting structure, a controllable power element connected with said side clamping bar for advancing the same toward such an inwardly facing side surface, and a plurality of cylindrical rotary drive elements resiliently mounted for vertical movement adjacent the support surface of the miter supporting structure and transversely to the longitudinal disposition thereof, said rotary drive elements normally having their respective cylindrical surfaces extending upwardly for a small distance through the plane of the supporting surface of such miter structure, and said rotary drive elements being adapted for connection to a source of rotary power, whereby said clamping bars will, after such work pieces have been advanced by said rotary drive elements longitudinally along the support structure and then stopped, be advanced to engage such work pieces and depress said rotary drive elements and thereby securely clamp the work pieces against such support structure surfaces while the saw is operated, and said rotary drive elements will, immediately upon release of said clamping bars, raise the work pieces and drive the same longitudinally over the supporting structure.

References Cited in the file of this patent

UNITED STATES PATENTS

| | | |
|---|---|---|
| 410,777 | Abbott | Sept. 10, 1889 |
| 957,779 | Leaver | May 10, 1910 |
| 1,262,943 | Gustafson | Apr. 16, 1918 |
| 1,700,683 | Madsen | Jan. 29, 1929 |
| 2,540,004 | McFall | Jan. 30, 1951 |
| 2,583,219 | Lancaster | Jan. 22, 1952 |
| 2,662,563 | Grove | Dec. 15, 1953 |

FOREIGN PATENTS

| | | |
|---|---|---|
| 611,599 | Great Britain | Nov. 1, 1948 |